(12) United States Patent
Maalouf et al.

(10) Patent No.: US 7,894,430 B2
(45) Date of Patent: Feb. 22, 2011

(54) HUB AND SPOKE MULTICAST MODEL

(75) Inventors: Amal Maalouf, Stittsville (CA); Daniel Williston, Stittsville (CA); Yiqun Cai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 11/943,893

(22) Filed: Nov. 21, 2007

(65) Prior Publication Data

US 2009/0129383 A1   May 21, 2009

(51) Int. Cl.
*H04L 12/28* (2006.01)

(52) U.S. Cl. .................... 370/390; 370/392; 370/395.31
(58) Field of Classification Search ........................ None
See application file for complete search history.

(56) References Cited

U.S. PATENT DOCUMENTS

| | | | |
|---|---|---|---|
| 2004/0037279 A1* | 2/2004 | Zelig et al. | 370/390 |
| 2007/0206597 A1* | 9/2007 | Asati et al. | 370/392 |
| 2007/0226630 A1* | 9/2007 | Farid et al. | 715/734 |
| 2010/0054245 A1* | 3/2010 | Asati et al. | 370/390 |
| 2010/0135294 A1* | 6/2010 | Asati et al. | 370/390 |
| 2010/0205428 A1* | 8/2010 | Weis et al. | 713/153 |

* cited by examiner

*Primary Examiner*—Chi H Pham
*Assistant Examiner*—Kouroush Mohebbi
(74) *Attorney, Agent, or Firm*—Patterson & Sheridan, LLP

(57) ABSTRACT

Techniques for implementing multicast messaging between spokes in a hub and spoke network are provided in the present disclosure. Multicast messages may be efficiently routed by creating separate multicast groups for upstream traffic from a source spoke to the hub (a "To Hub" group joined by the hub) and downstream traffic from the hub to spokes (a "From Hub" group joined by spokes interested in receiving multicast messages). A source spoke may send a multicast message encapsulated in a packet with the "To Hub" group address as the destination. Upon receipt, the hub may re-route the multicast message to spokes that have joined the "From Hub" group by encapsulating the original message in a packet with the "From Hub" group address as the destination.

20 Claims, 10 Drawing Sheets

HUB AND SPOKE MULTICAST MODEL

BACKGROUND OF THE INVENTION

1. Field of the Invention

Embodiments of the present invention generally relate to networking and, more particularly, to hub and spoke network models.

2. Description of the Related Art

A hub and spoke network model is one where a hub (having one or more routers) acts as the intermediary for all traffic sent to the spokes (other nodes in the network). Assuming a network with two spokes, spoke 1 and Spoke 2, for Spoke 1 to communicate with Spoke 2, traffic from spoke 1 is sent to the hub, which then sends the traffic to Spoke 2. Routing all traffic through the hub may allow centralized application of policies, providing a level of security on the network. Such a model is useful, particularly, when there are no links between the spokes, or when there are only low-speed links between the spokes, and the links between the hub and the spokes are high-speed.

The term multicast generally refers to the delivery of messages from a single source to a group of destinations simultaneously over a network. Ideally, the messages are delivered only once to each destination, and messages are duplicated only when communication links to the destinations split into separate links to separate destinations. To efficiently send multicast messages, it is common to form multicast groups and establish neighbor relationships between adjacent nodes. However, this technique is not readily available in hub and spoke networks, because the spokes do not communicate with each other directly.

Accordingly, what is needed is a technique for efficiently sending multicast messages in a hub and spoke network.

BRIEF DESCRIPTION OF THE DRAWINGS

So that features of the present invention can be understood in detail, a particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide techniques for implementing multicast messaging between spokes in a hub and spoke network. Multicast messages may be efficiently routed by creating separate multicast groups for upstream traffic from a source spoke to the hub (a "To Hub" group joined by the hub) and downstream traffic from the hub to spokes (a "From Hub" group joined by spokes interested in receiving multicast messages). A source spoke may send a multicast message encapsulated in a packet with the "To Hub" group address as the destination. Upon receipt, the hub may re-route the multicast message to spokes that have joined the "From Hub" group by encapsulating the original message in a packet with the "From Hub" group address as the destination.

Example Hub and Spoke Network

Figure 1:
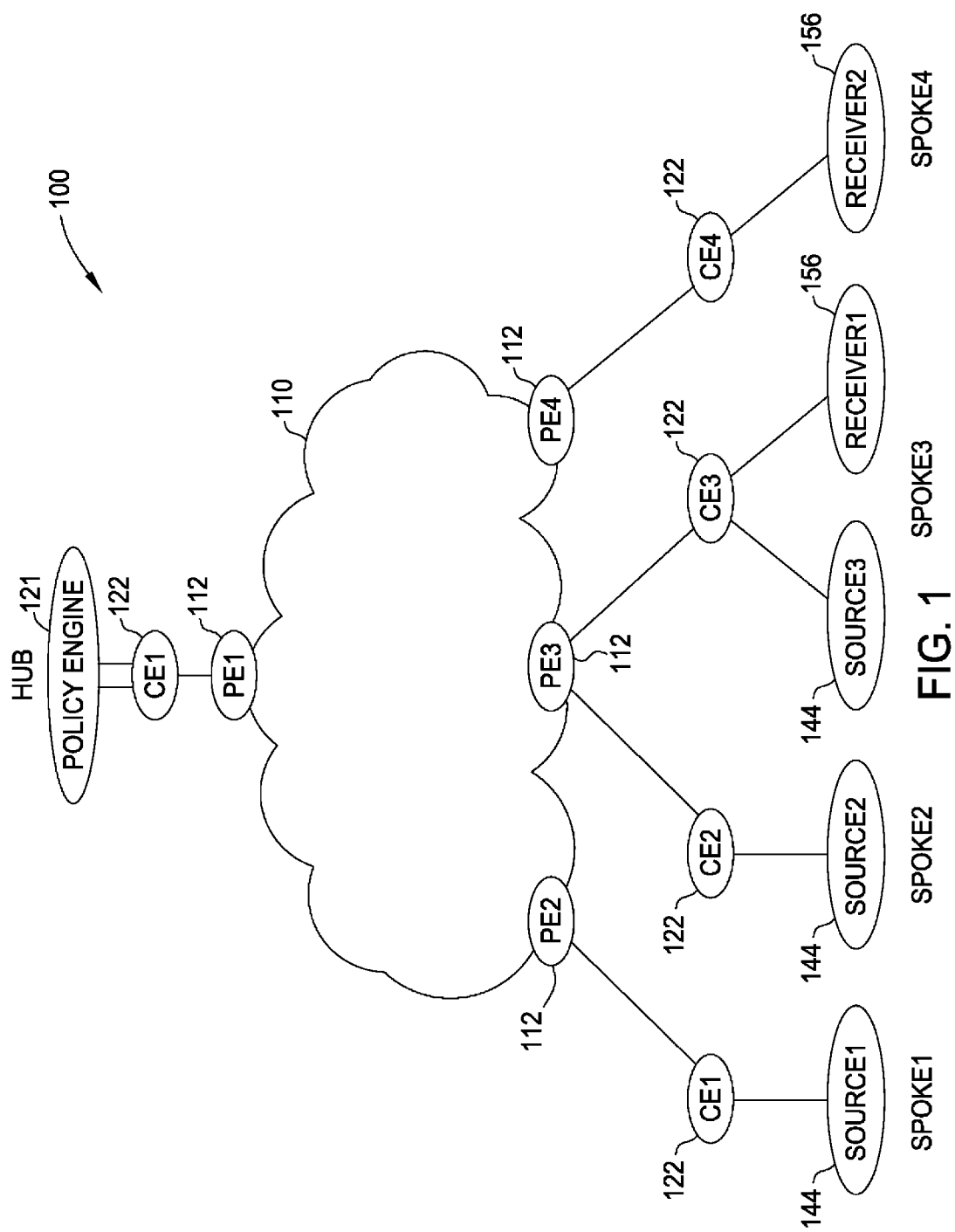
FIG. 1 illustrates an example hub and spoke network, according to one embodiment of the invention.

FIG. 1 illustrates an example hub and spoke network 100 connecting four spoke sites (Spokes 1-4) via a hub site, according to one embodiment of the invention. In this configuration, network traffic may not be allowed directly between the spokes, but rather all inter-spoke traffic may be routed through the hub site. Routing all inter-spoke traffic through the hub site may allow centralized application of policies, for example, by a Policy Engine 121. The policy engine 121 may be part of a hub router or may be a specialized device, possibly physically removed from the hub router. In any case, the Policy Engine may be configured to apply an arbitrary set of policies, for example, as defined by a user. Such policies may, for example, specify any sort of data manipulation (e.g., drop the packet, alter the packet, record the packet, and/or encrypt the packet).

As illustrated, the hub and spoke sites may connect to a service provider network 110 via customer edge (CE) routers 122 connected to provider edge (PE) routers 112 that are part of the provider network 110. While not shown, those skilled in the art will appreciate that the provider network 110 may also include a "fabric" of intermediate network devices, such as switches and routers that route and support traffic between the PE routers 112.

In the following description, PE and CE routers of a Hub site will be referred to as "Hub PEs" and "Hub CEs," respectively, while PE and CE routers of a Spoke site will be referred to as "Spoke PEs" and "Spoke CEs," respectively. The term source generally refers to any device at a spoke site capable of sending a multicast message, while the term receiver generally refers to any device at a spoke site capable of receiving a multicast message. The term "Source Spoke" will refer to a spoke site having a source device sending a multicast message, while the term "Receiver Spoke" will refer to a spoke site having a receiver device capable of receiving a multicast message.

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CE routers 122 at hub and spoke sites based on pre-established IP routing information.

The hub and spoke sites may include sites from different business entities and/or multiple sites from the same business entity (e.g., regional branch offices and headquarters). In order to provide secure communications between sites, virtual private networks (VPNs) may be established, for example when routing traffic between sites within the same business entity over the provider network 110. VPNs enable IP traffic to be routed securely over the provider network 110 by preventing the communication of data between sites that are not part of the same VPN.

Spoke sites may include sources only, receivers only, or a combination of sources and receivers. In the illustrated example, Spokes 1 and 2 have only sources (Source 1 and Source 2, respectively), spoke 3 has both a source and receiver (Source 3 and Receiver 1, respectively), while Spoke 4 has only a receiver (Receiver 2). Thus, Spokes 1-3 are Source Spokes, while Spokes 3-5 are Receiver Spokes. As will be described in greater detail below, in order to enable multicast messaging, spoke PEs may be configured with "To Hub" table entries, "From Hub" table entries, or both, depending on whether the corresponding spoke sites have sources, receivers, or both.

Figure 2:
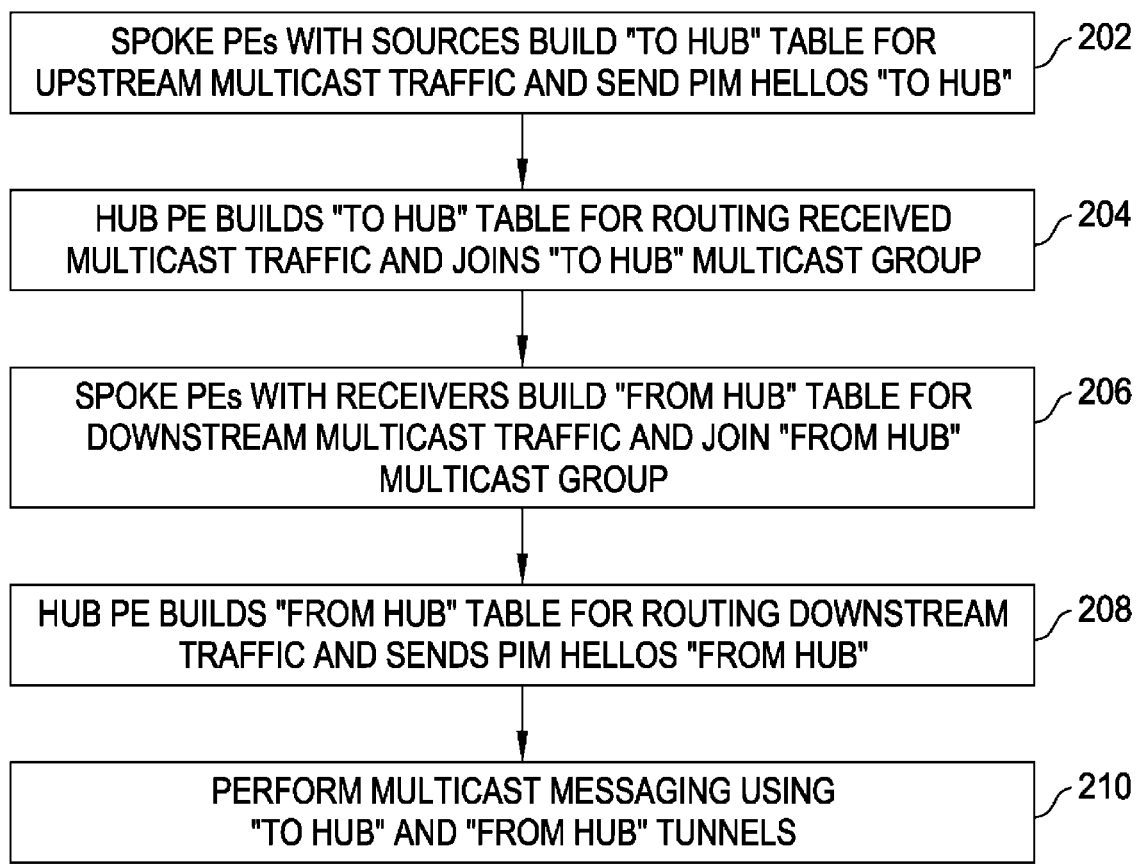
FIG. 2 is a flowchart of example operations for configuring a hub and spoke network for multicast messaging, according to one embodiment of the invention.

FIG. 2 is a flowchart of example operations 200 for configuring a hub and spoke network for multicast messaging. The operations may be described with reference to FIGS. 3A and 3B, which illustrate example "To Hub" and "From Hub" tunnels established between the hub site and spoke sites to perform multicast messaging. While the operations 200 are shown in a particular order, those skilled in the art will recognize that for different embodiments, the same operations may be performed in a different order.

The operations 200 begin, at step 202, with spoke PEs that have sources attached building "To Hub" tables with entries to control how to route upstream multicast traffic to the hub. At step 204, the Hub PE builds a "To Hub" table with entries to control how to route upstream multicast messages (received from Source Spokes).

Figure 3A:
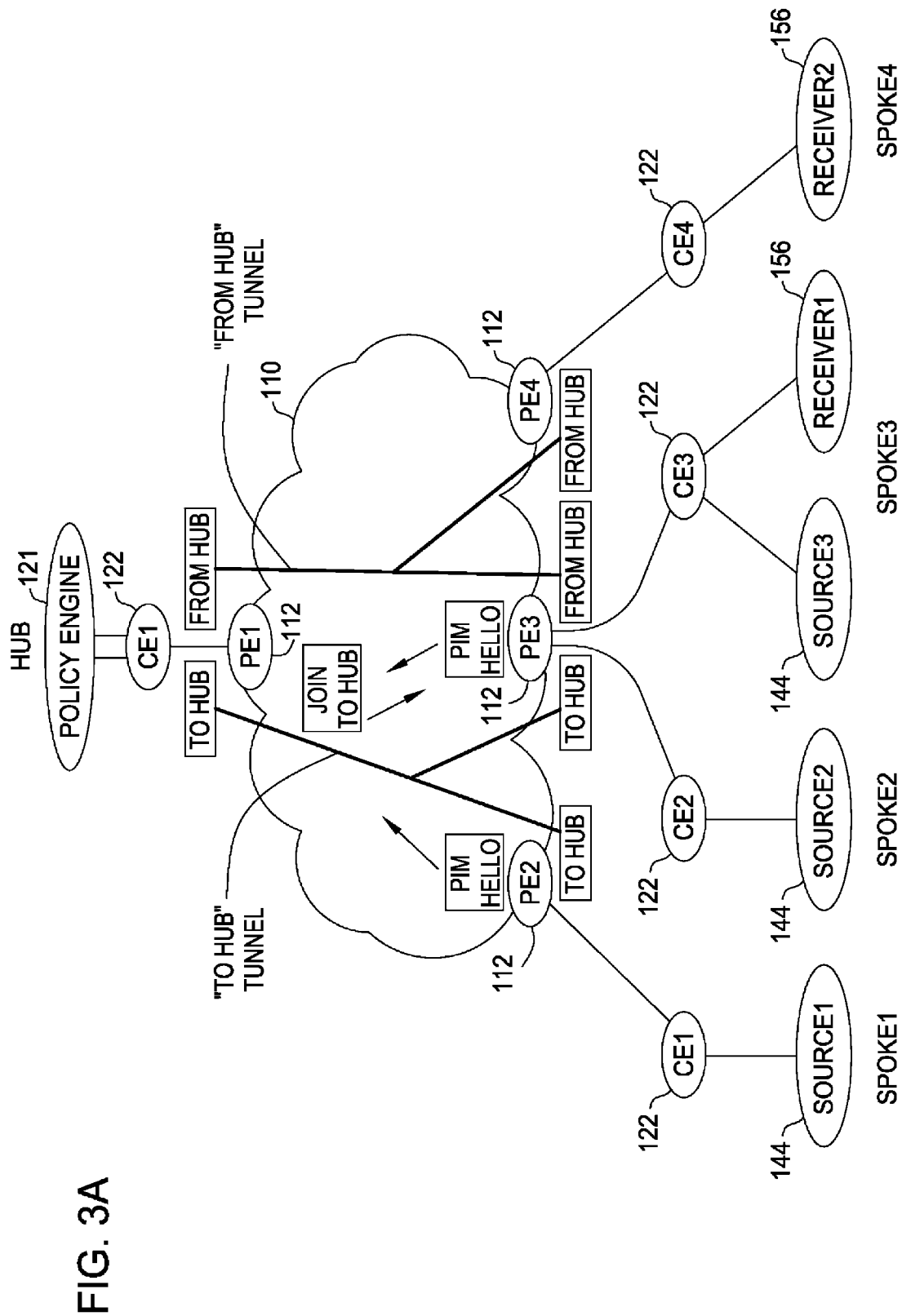
FIGS. 3A and 3B illustrate "To Hub" and "From Hub" tunnels in a hub and spoke network, according to one embodiment of the invention.

As illustrated in FIG. 3A, creation of these To Hub entries may help establish a "To Hub" tunnel between Spoke PEs 2 and 3 and the Hub PE1. As used herein, the term tunnel generally refers to a point to point communication path between two devices, in this example, Hub and Spoke PEs. As illustrated, PE1 may send Protocol Independent Multicast (PIM) Join messages to join the "To Hub" group. PE2 and PE3 may send PIM Hello messages with a destination address of the "To Hub" group.

At step 206, Spoke PEs build "From Hub" tables with entries for routing downstream multicast traffic to Receiver Spokes that have joined the "From Hub" multicast group. At step 208, the Hub PE builds a "From Hub" table with entries for routing downstream multicast traffic from the Hub PE.

Figure 3B:
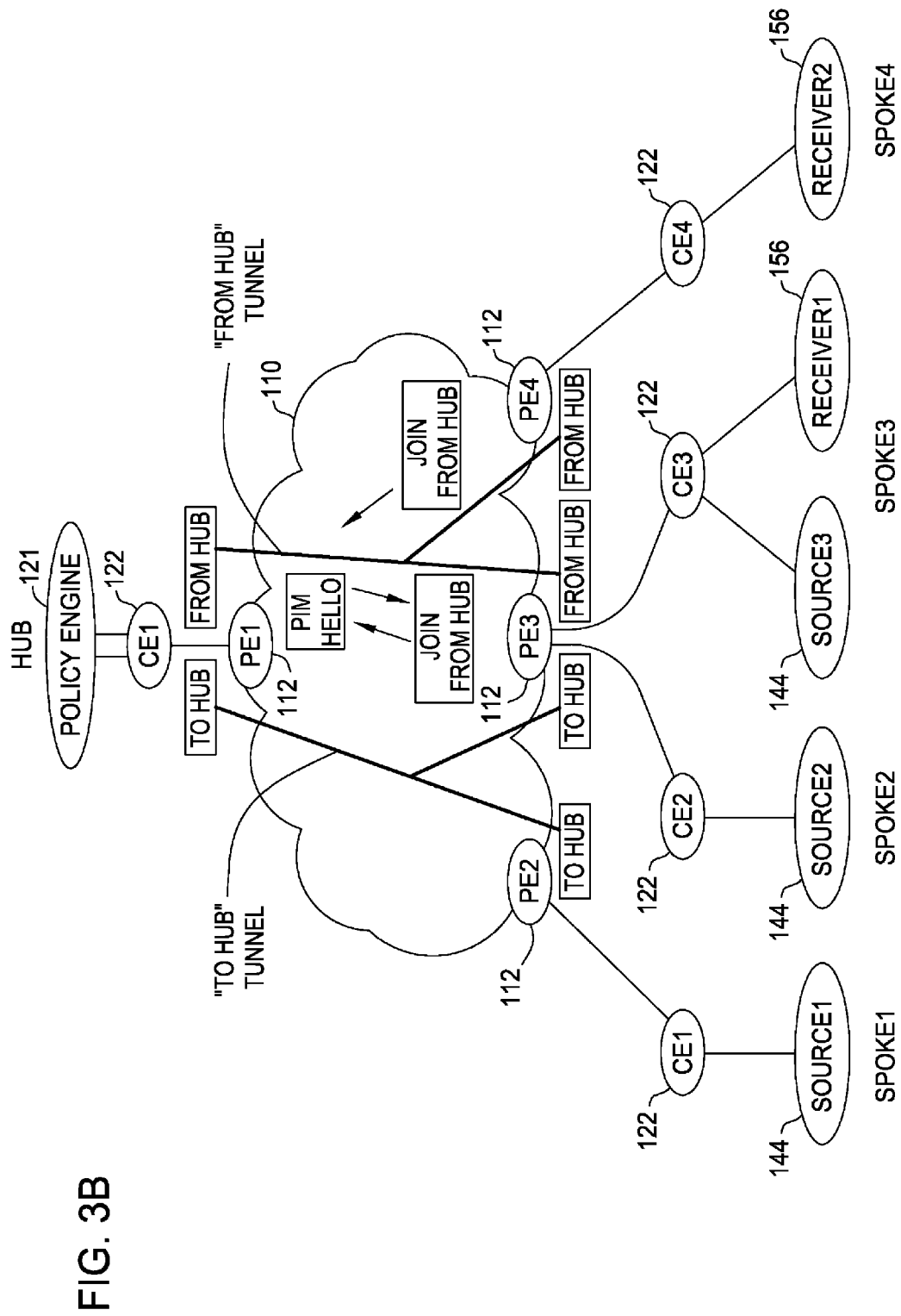

As illustrated in FIG. 3B, creation of these From Hub entries may help establish a "From Hub" tunnel for routing downstream multicast traffic from the Hub PE1 to Receiver Spoke PEs 3 and 4. As illustrated, PE3 and PE4 may send PIM Join messages to join the "From Hub" group. PE1 may send PIM Hello messages with a destination address of the "From Hub" group.

As illustrated in FIGS. 3A and 3B, following operations 202-208, Spoke PE2 will have a To Hub table and Spoke PE4 will have a From Hub table. Because Spoke PE3 has both receivers and sources, it has both To Hub and From Hub tables. Similarly, because Hub PE1 will be routing upstream multicast traffic (targeting the To Hub group) and downstream traffic (targeting the From Hub group), Hub PE1 has both To Hub and From Hub tables.

Figure 4:
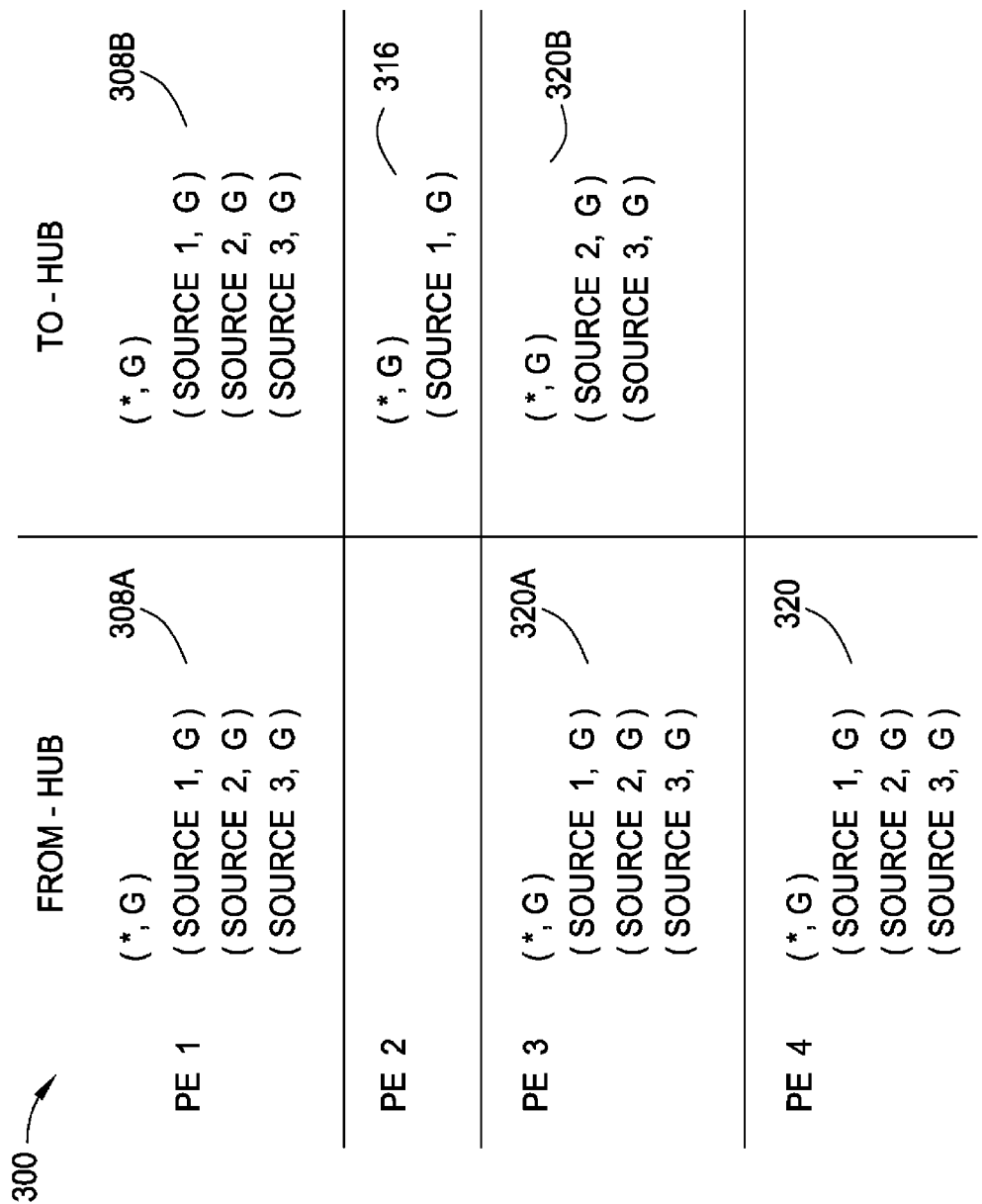
FIG. 4 illustrates example "To Hub" and "From Hub" routing table entries, according to one embodiment of the invention.

FIG. 4 illustrates example entries in these "To Hub" and "From Hub" tables, according to one embodiment of the invention. As illustrated, both "From Hub" table 408A and "To Hub" table 408B on PE 1 contain entries corresponding to the sources: (source 1, G), (source 2, G), and (source 3, G). Using these entries, PE1 can identify multicast traffic from these sources that target multicast group G and route them accordingly.

For some embodiments, upstream traffic may be routed to the Policy Engine 121, for example, for the application of policies or for some other type of processing. In such embodiments, PE1 may decapsulate the original packet and forward it on to RP 121 via CE1. After processing the original packet, the RP may send it back and PE1 may encapsulate the packet with a header specifying the To Hub group as the destination and send the encapsulated packet downstream using "From Hub" table 408B.

For some embodiments, traffic may be automatically forwarded to the Receiver Spokes without having to go to RP 121. For example, To Hub entries may specify that PE1 forward multicast traffic to Receiver Spokes by merely re-writing header information of the encapsulated packet (containing the original packet as payload) to swap the To Hub destination address with the From Hub address (and update a checksum) and send the encapsulated packet with the new header down towards the Receiver Spokes.

According to one embodiment of the invention, the source addresses in the "To Hub" table are limited to the source nodes attached to a particular PE's spokes. For example, as shown in FIG. 1, source 1 is the only source node attached to PE 2's only spoke, spoke 1. Thus, the only entry with a specific source address for To Hub table 416 for PE2 specifies Source 1 (source 1, G), while the To Hub table 420B for PE3 contains entries for Source 2 (source 2, G) and Source 3 (source 3, G). Because any source may originate multicast traffic, the From Hub tables, may include entries for all possible sources.

As illustrated, "From Hub" and "To Hub" tables may be populated with a wildcard (*, G) entry to identify all sources with a destination address of group G as multicast traffic both to and from the hub. According to one embodiment of the invention, the (*, G) entries may be created in response to PEs 1-4 sending PIM messages to establish secure communication links between the hub PE and the spoke PEs.

Figure 5:
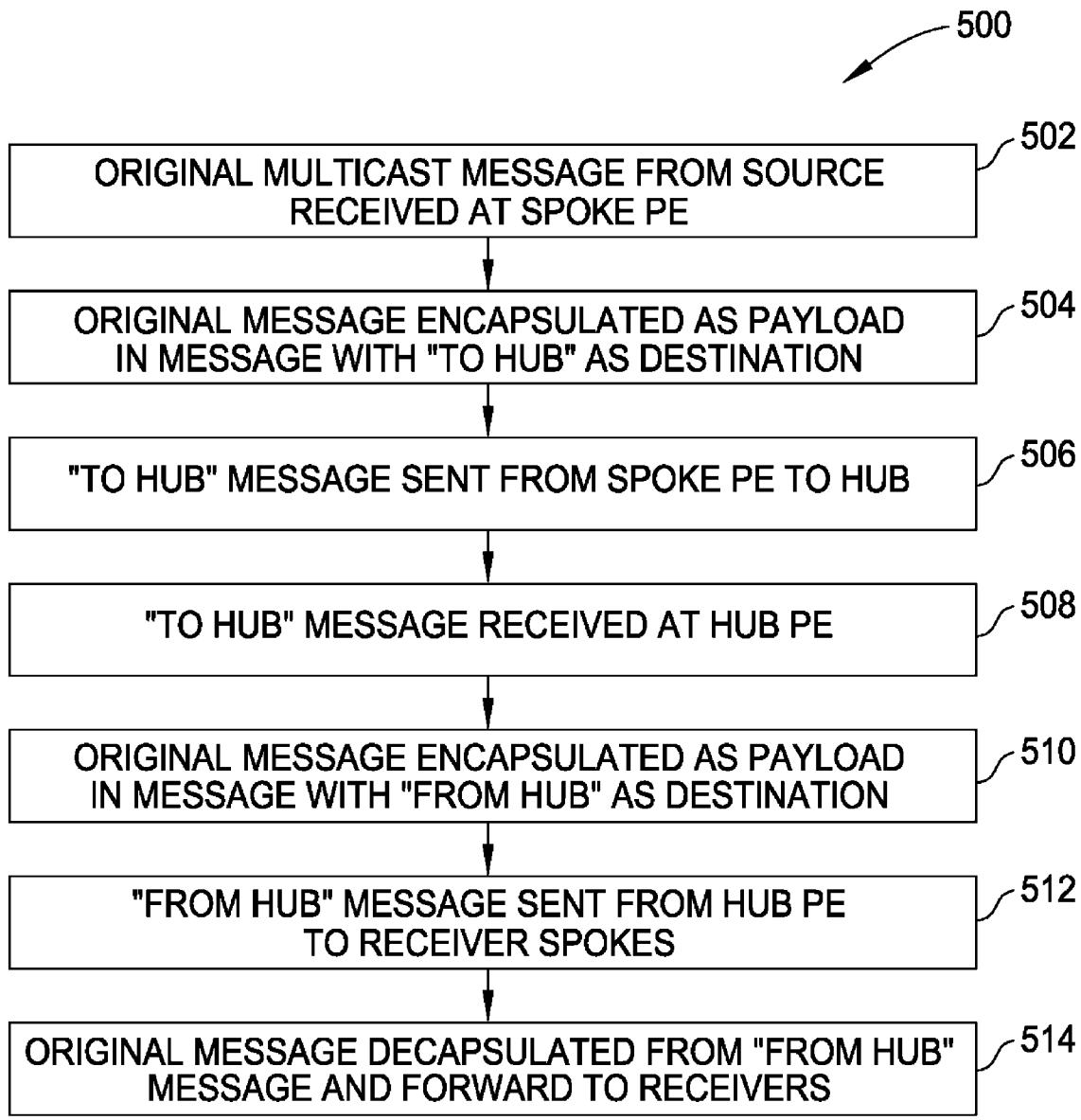
FIG. 5 is a flowchart of example operations for performing multicast messaging in a hub and spoke network, according to one embodiment of the invention.

FIG. 5 is a flowchart illustrating example operations 500 for sending multicast traffic between spokes. The operations 500 may be described with reference to FIGS. 6A-6D which illustrate the routing flow of an example multicast packet from Source Spoke 1 to Receiver Spokes 3 and 4, via the Hub site. The example routing illustrated in FIGS. 6A-6D assume Receiver Spokes 3 and 4 have joined the From Hub multicast group.

Figure 6A:
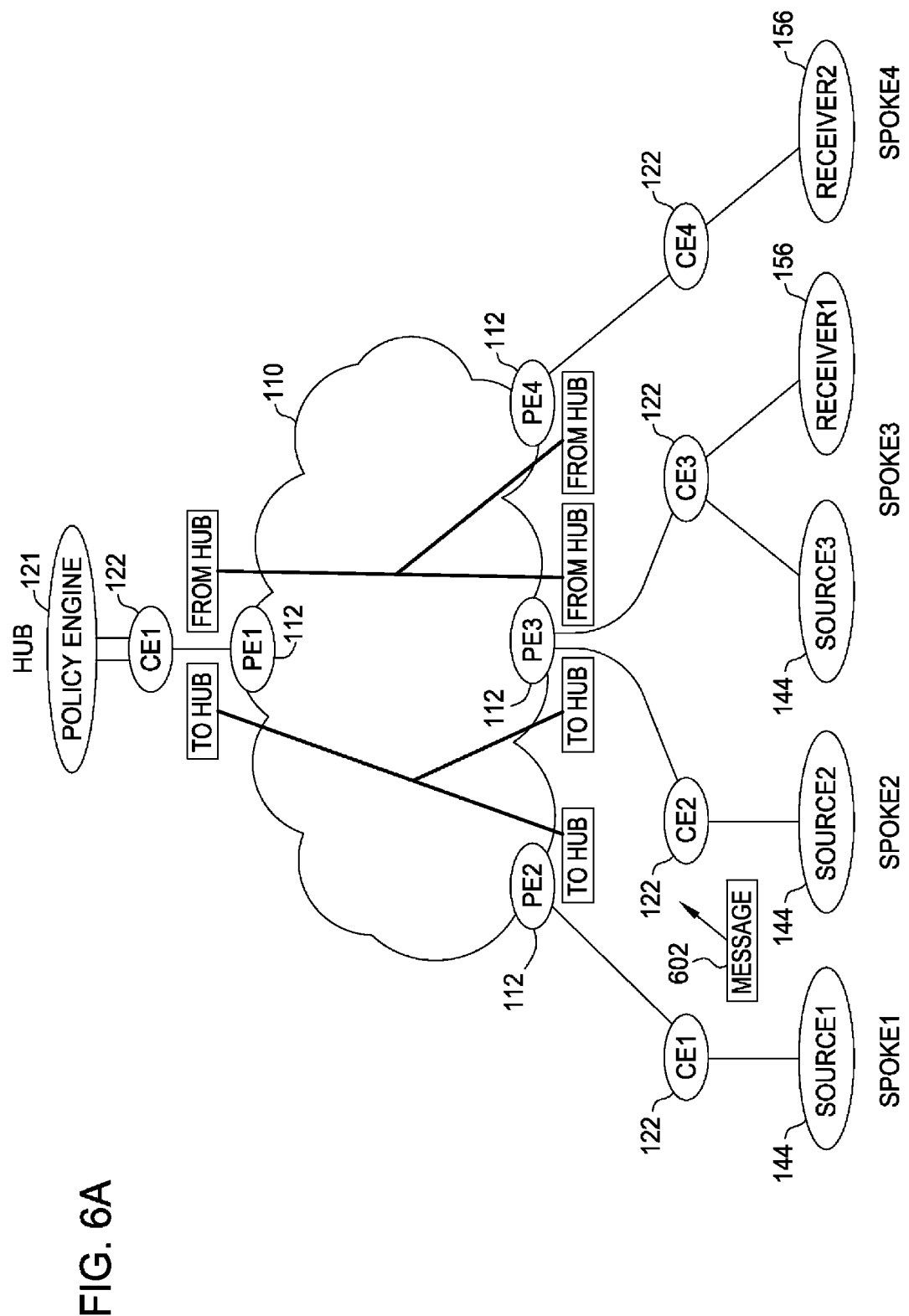
FIGS. 6A-6D illustrate multicast message flow in a hub and spoke multicast network, according to one embodiment of the invention.

At step 502, a Spoke PE receives an original multicast message from a source. For example, as illustrated in FIG. 6A, Source PE1 receives an original multicast message 602 from Source 1.

Figure 6B:
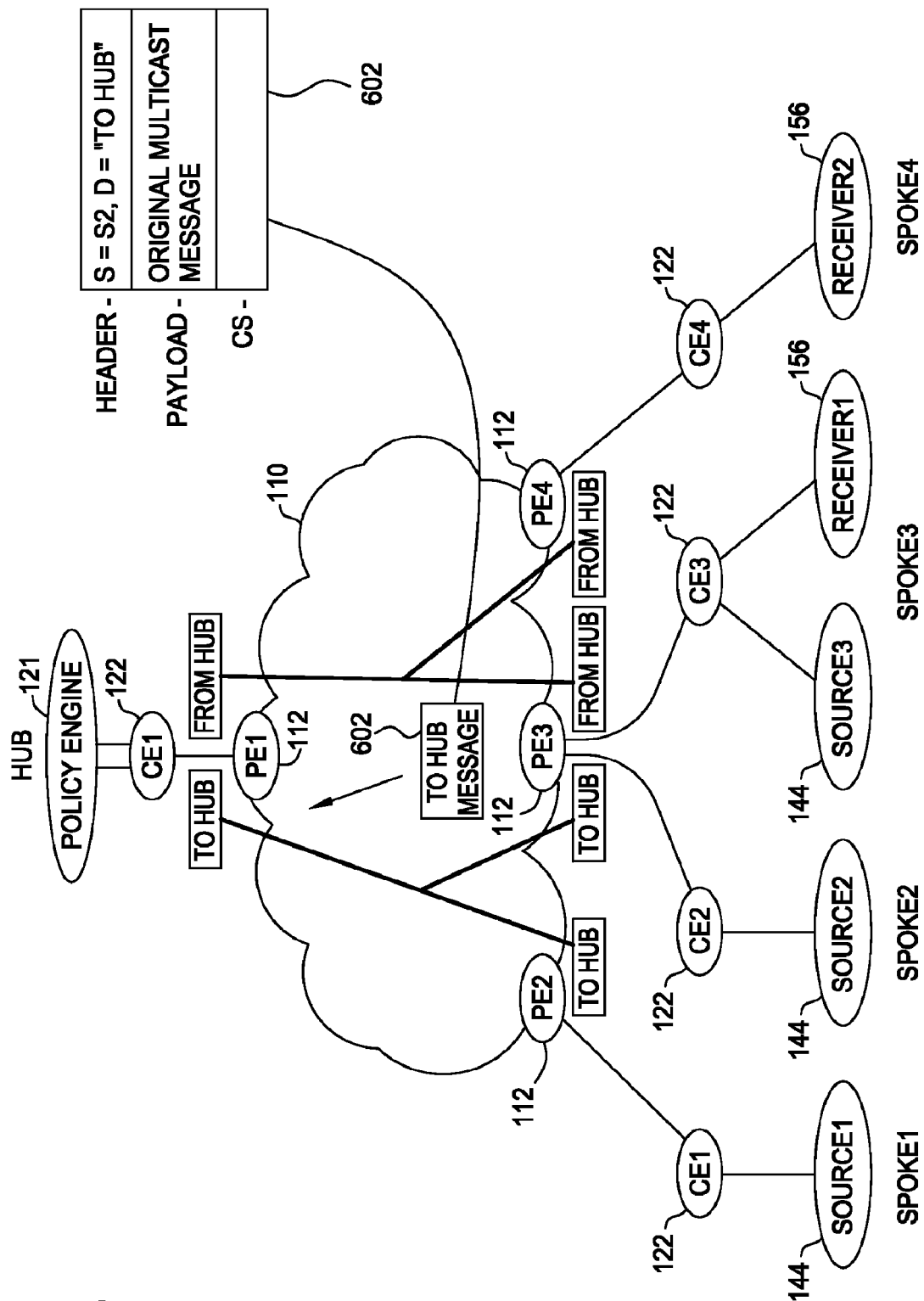

At step 504, the original multicast message is encapsulated as payload in a message with the "To Hub" group as the destination address. FIG. 6B illustrates a To Hub message 604 having the original message 602 encapsulated as payload and having a header with the To Hub group as the destination address.

At step 506, the To Hub message 604 is sent from the Spoke PE to the Hub. At step 508, the Hub PE receives the To Hub message 604. As described above, depending on the embodiment, the Hub PE may be configured to extract (decapsulate) the original message from the To Hub message and forwarded the original message to the Policy Engine 121 for processing. As an alternative, the Hub PE may be configured to automatically forward the original message encapsulated as payload in a From Hub message (e.g., with the Hub PE re-writing header information with the From Hub destination address and generating a new checksum).

Figure 6C:
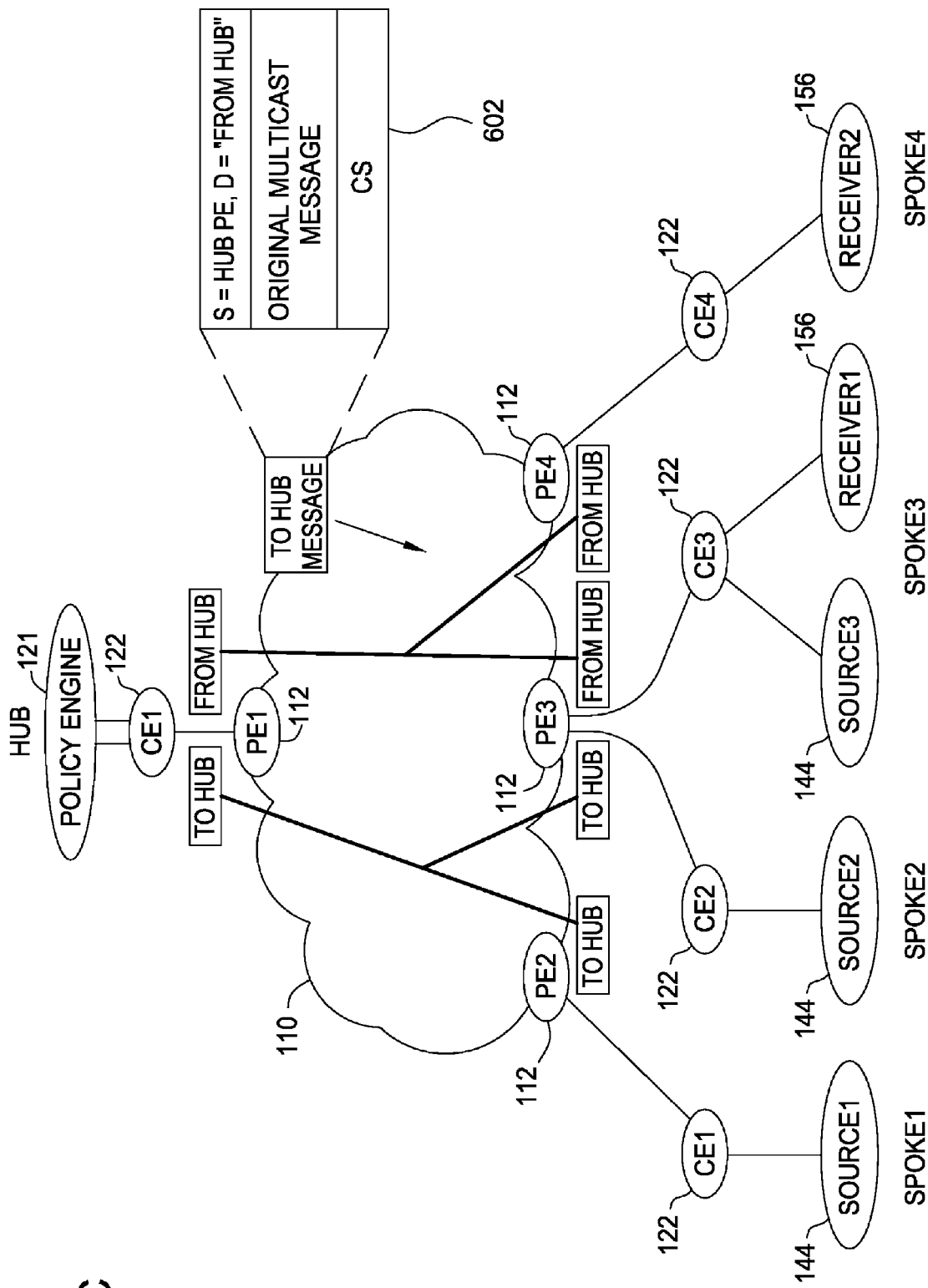
Figure 6D:
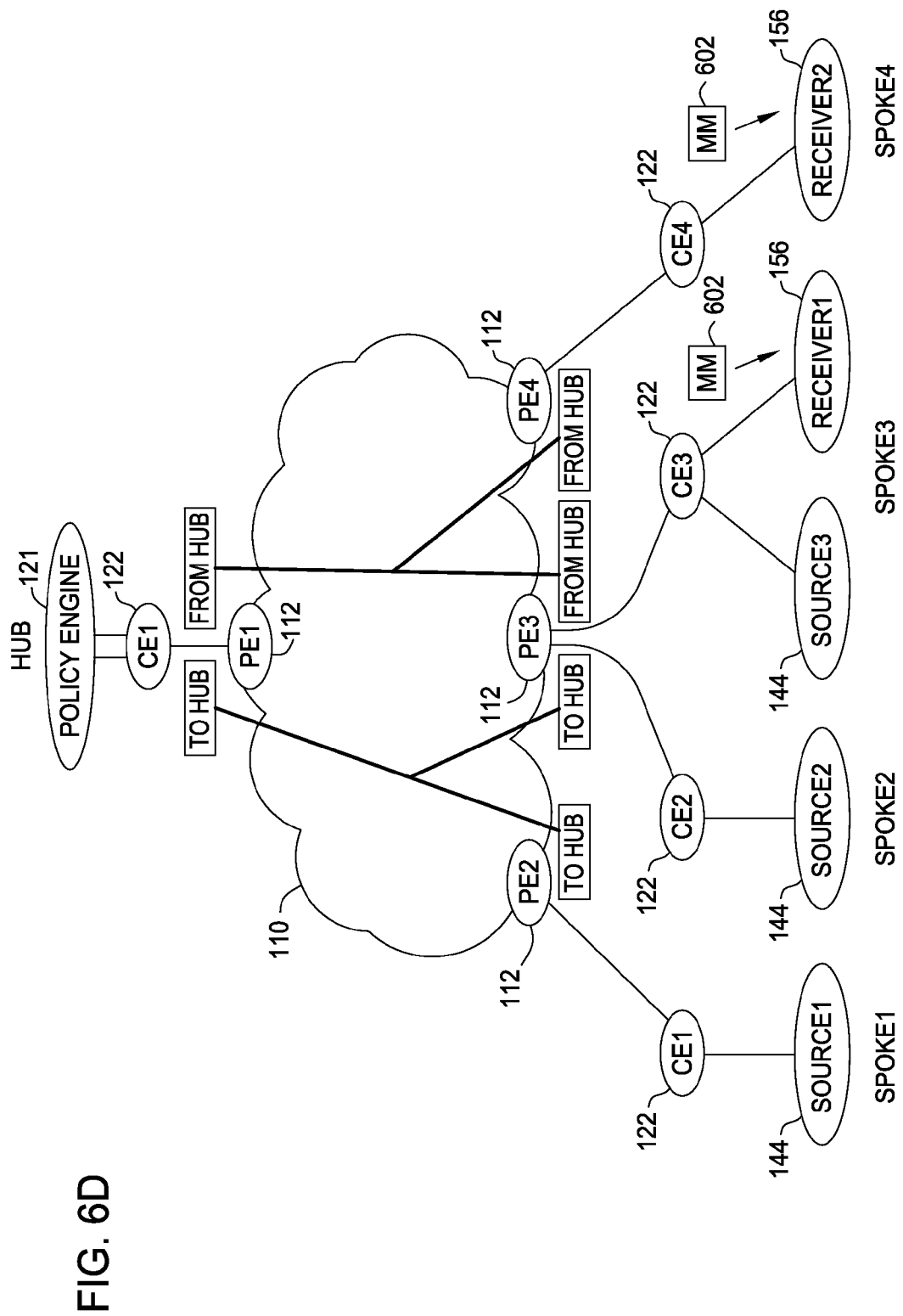

In either case, at step 510, the original message is encapsulated as payload in a From Hub message which is sent, at step 512, from the Hub to the Receiver Spokes. This is illustrated in FIG. 6C, which shows a new From Hub message 606, with the From Hub Group as the destination address.

At step 514, Receiver Spokes that have joined the From Hub group receive the From Hub message, decapsulate the original message, and forward the original message to their receivers. This is illustrated in FIG. 6C, which shows Spoke CE3 and Spoke CE4 forwarding the original message 602 to Receiver 1 and Receiver 2, respectively.

Local Turnaround

As illustrated by Spoke 3, some spoke sites may have both sources and receivers. For some embodiments, some form of "local turn-around" may be implemented in an effort to prevent a multicast message originating from a source at a spoke from having to travel round trip to the hub to reach a receiver located at the same spoke. Making the message available locally without traveling to the hub may result in enhanced performance for local devices at a source site, while still allowing multicast messaging to other Spokes via the Hub as described above. For some embodiments, local turn-around may be a feature configurable (e.g., by an administrator) allowing local turn-around to be selectively enabled or disabled.

Utilizing some form of local turn-around at Spoke 3 (with both a Source and Receiver as shown in FIG. 6C), Source 3 may be able to send a message to Receiver 1 without the message traveling round-trip to the Hub. Depending on the embodiment, local turn-around functionality may be implemented at the PE or CE. As an example, CE3 or PE3 may have routing table entries that indicate that Receiver 1 has joined a multicast group in order to receive multicast traffic from Source 3. Upon receiving an original message from Source 3, CE3 or PE3 may forward a copy of the original message directly to Receiver 1.

The original message may also be encapsulated, as described above, as payload in a To Hub message in order to reach receivers of other Spokes. A similar approach may be implemented to allow turn-around functionality to Sources and Receivers attached to CEs that share a common PE. For example, PE3 may be configured to allow a turn-around functionality to send a message originating from Source 2 connected to CE2 and Receiver 1 connected to CE3 because CE2 and CE3 share PE3. Such functionality may provide enhanced performance for devices in different Spokes that share a common PE.

If local turn-around is enabled at a Spoke (e.g., at Spoke 3 having Source 3 and Receiver 1), measures may be taken to prevent a redundant message from being sent back to Receiver 1 upon arrival of the resulting From Hub message. For example, when a copy of a message is sent directly to a local receiver, some type of indication may be maintained at the corresponding CE or PE (e.g., in a status register). As a result, when the corresponding From Hub message is received, the message may be discarded/ignored based on the stored status, thereby preventing the unnecessary consumption of bandwidth caused by the routing of redundant messages.

While the foregoing is directed to embodiments of the present invention, other and further embodiments of the invention may be devised without departing from the basic scope thereof, and the scope thereof is determined by the claims that follow.

The invention claimed is:

1. A method comprising: receiving a multicast packet from a source node of a first spoke in a hub and spoke network having a hub and a plurality of spokes, the multicast packet intended for members of a first multicast group;

upon determining that the first multicast group comprises a receiver node that resides in the first spoke in the hub and spoke network, routing the multicast packet to the receiver node that resides in the first spoke by operation of one or more computer processors, without having to first send the multicast packet to the hub; and upon determining that the first multicast group comprises a receiver node that resides in the second spoke in the hub and spoke network:

encapsulating the multicast packet as payload in an upstream packet, the upstream packet having a destination address of a second multicast group to which the hub is a member; and sending the upstream packet towards the hub to be routed to the receiver node that resides in the second spoke.

2. The method of claim 1, wherein sending the upstream packet towards the hub comprises:

sending the upstream packet towards the hub via a Multiprotocol Label Switching (MPLS) network.

3. The method of claim 2, wherein the receiving, encapsulating, and sending are performed by at least one of a customer edge (CE) router and a provider edge (PE) router of the MPLS network.

4. The method of claim 1, further comprising:

routing the upstream packet in accordance with an entry in a routing table corresponding to the first multicast group.

5. The method of claim 4, wherein the routing table includes entries for routing multicast packets from multiple sources in the first spoke.

6. The method of claim 1, further comprising:

receiving the multicast packet encapsulated as payload in a downstream packet from the hub; and discarding the downstream packet without routing the multicast packet again to the receiver node that resides in the first spoke.

7. A method comprising: receiving a downstream packet from a source node of a hub in a hub and spoke network having a hub and a plurality of spokes, the downstream packet having encapsulated therein a multicast packet intended for members of a first multicast group and originating from a source in a first spoke of the hub and spoke network;

extracting the multicast packet by operation of one or more computer processors; and forwarding the multicast packet to a receiver node of a second spoke of the hub and spoke network, wherein the receiver node of the second spoke is a member of the first multicast group;

wherein if the first multicast group includes a receiver node of the first spoke in the hub and spoke network, then the multicast packet is routed to the receiver node of the first spoke without the multicast packet first being sent to the hub.

8. The method of claim 7, wherein receiving the downstream packet from the source node of the hub comprises:

receiving the downstream packet via a Multiprotocol Label witching (MPLS) network.

9. The method of claim 8, wherein the receiving, extracting, and forwarding are performed by at least one of a customer edge (CE) router and a provider edge (PE) router of the MPLS network.

10. The method of claim 7, wherein forwarding the multicast packet to the receiver node comprises:

forwarding the multicast packet in accordance with an entry in a routing table corresponding to the first multicast group.

11. An apparatus, comprising:
- hardware logic for receiving a multicast packet from a source node of a first spoke in a hub and spoke network having a hub and a plurality of spokes, the multicast packet intended for members of a first multicast group, wherein at least one of the members of the first multicast group is a receiver node in a second spoke of the hub and spoke network;
- hardware logic for encapsulating the original packet as payload in an upstream packet by operation of one or more computer processors, the upstream packet having a destination address of a second multicast group to which the hub is a member; and
- hardware logic sending the upstream packet towards the hub;
- wherein if the first multicast group includes a receiver node of the first spoke in the hub and spoke network, then the multicast packet is routed to the receiver node of the first spoke without the multicast packet first being sent to the hub.

12. The apparatus of claim 11, further comprising a routing table with one or more entries for routing packets originating from the source node and targeting the first multicast group.

13. The apparatus of claim 12, wherein the routing table comprises one or more entries for routing packets to the second multicast group.

14. An apparatus, comprising:
- hardware logic for receiving a downstream packet from a source node of a hub in a hub and spoke network having a hub and a plurality of spokes, the downstream packet having encapsulated therein a multicast packet intended for members of a first multicast group and originating from a source in a first spoke of the hub and spoke network;
- hardware logic for extracting the multicast packet by operation of one or more computer processors; and
- hardware logic for forwarding the multicast packet to a receiver node of a second spoke of the hub and spoke network, wherein the receiver node of the second spoke is a member of the first multicast group;
- wherein if the first multicast group includes a receiver node of the first spoke in the hub and spoke network, then the multicast packet is routed to the receiver node of the first spoke without the multicast packet first being sent to the hub.

15. The apparatus of claim 14, further comprising a routing table with one or more entries for routing packets originating from the source node of the hub and targeting the first multicast group.

16. The apparatus of claim 15, comprising a routing table with one or more entries for routing packets originating from a source node of the second spoke to a multicast group to which the hub belongs.

17. An apparatus, comprising:
- hardware logic for receiving, from a first spoke of a hub and spoke network having a hub and a plurality of spokes, an upstream packet having a multicast packet targeting a first multicast group encapsulated therein, the upstream packet having a destination address of a second multicast group joined by the apparatus; and
- hardware logic for sending a downstream packet having the multicast packet encapsulated therein towards a second spoke having a receiver node belonging to the first multicast group and by operation of one or more computer processors, the downstream packet having a destination address of a third multicast group joined by a device attached to the second spoke;
- wherein if the first multicast group includes a receiver node of the first spoke in the hub and spoke network, then the multicast packet is routed to the receiver node of the first spoke without the multicast packet first being sent to the hub.

18. The apparatus of claim 17, further comprising:
- a first routing table with entries for routing the upstream packet; and
- a second routing table with entries for routing the downstream packet.

19. The apparatus of claim 17, further comprising logic for extracting the multicast packet from the upstream packet and forwarding the multicast packet to a device in the hub for the application of policies.

20. The apparatus of claim 17, further comprising logic for generating the downstream packet by modifying header information of the upstream packet.

\* \* \* \* \*

UNITED STATES PATENT AND TRADEMARK OFFICE
CERTIFICATE OF CORRECTION

| | | |
|---|---|---|
| PATENT NO. | : 7,894,430 B2 | Page 1 of 1 |
| APPLICATION NO. | : 11/943893 | |
| DATED | : February 22, 2011 | |
| INVENTOR(S) | : Maalouf et al. | |

It is certified that error appears in the above-identified patent and that said Letters Patent is hereby corrected as shown below:

In the Claims:

Column 6, Claim 8, Line 57, please delete "witching" and insert --switching-- therefor.

Signed and Sealed this
Seventh Day of June, 2011

David J. Kappos
*Director of the United States Patent and Trademark Office*